United States Patent
Alsup

(10) Patent No.: US 7,562,207 B2
(45) Date of Patent: Jul. 14, 2009

(54) DETERMINISTIC MICROCONTROLLER WITH CONTEXT MANAGER

(75) Inventor: Andrew David Alsup, Albuquerque, NM (US)

(73) Assignee: Innovasic, Inc., Albuquorque, NM (US)

( * ) Notice: Subject to any disclaimer, the term of this patent is extended or adjusted under 35 U.S.C. 154(b) by 76 days.

(21) Appl. No.: 11/258,822

(22) Filed: Oct. 26, 2005

(65) Prior Publication Data

US 2006/0168427 A1 Jul. 27, 2006

Related U.S. Application Data

(60) Provisional application No. 60/648,138, filed on Jan. 27, 2005.

(51) Int. Cl.
*G06F 9/00* (2006.01)
(52) U.S. Cl. .......................... 712/228; 712/1
(58) Field of Classification Search ............. 712/228, 712/1
See application file for complete search history.

(56) References Cited

U.S. PATENT DOCUMENTS 5,572,700 A * 11/1996 Hays et al. ................. 711/139
5,758,188 A    5/1998  Applebaum et al.
6,389,449 B1 *  5/2002  Nemirovsky et al. ........ 718/108
6,401,154 B1    6/2002  Chiu et al.
6,625,719 B2    9/2003  Leach et al.
7,117,346 B2 * 10/2006  Moyer et al. ................. 712/228
7,493,621 B2 *  2/2009  Bradford et al. ............ 718/108
2003/0189940 A1 10/2003  Greenblat

OTHER PUBLICATIONS

"Intel Architecture Software Developer's Manual vol. 1: Basic Architecture"; 1999.*
Hennessy et al.; "Computer Organization and Design The Hardware/Software Interface"; 1998.*

* cited by examiner

*Primary Examiner*—Alford W Kindred
*Assistant Examiner*—Benjamin P Geib
(74) *Attorney, Agent, or Firm*—Donald J. Lenkszus

(57) ABSTRACT

A deterministic microprocessor is disclosed in which a plurality of sets of hardware registers is provided. A corresponding plurality of hardware contexts for the microcontroller is provided by the plurality of sets of hardware registers. A context manager controls the selection of the hardware registers such that contexts are changed within one bus cycle and a plurality of hardware contexts are provided.

23 Claims, 9 Drawing Sheets

DETERMINISTIC MICROCONTROLLER WITH CONTEXT MANAGER

RELATED APPLICATIONS

This application claims priority based upon Provisional Application for Patent Ser. No. 60/648,138 filed on Jan. 27, 2005.

FIELD OF THE INVENTION

The present invention pertains to microcontrollers and microprocessors.

BACKGROUND OF THE INVENTION

Manufacturers of microcontrollers typically target the consumer and automotive markets and additionally sell the same microcontrollers to the industrial markets. A wide variety of product families are offered, each of which offers multiple products differentiated with specific feature sets.

In the Industrial market, there is a demand for a wide variety of peripherals integrated on-chip with the microcontroller. This is due to the large number of applications; communication protocols and bus interfaces; data acquisition from multiple sensors and actuators; and controls of various motors.

This approach does not efficiently serve the needs of customers as it does not permit providing a 'perfect' match with customer requirements. Typically this approach forces customers to use products that are supersets of what are actually needed.

In many, if not most, applications microcontrollers must provide for task-switching and multi-threading. Certain time-critical events, e.g., interrupts from timers, communication ports, or external circuits, interrupt whatever the microprocessor utilized in the microcontroller is doing at the time and re-direct the microprocessor to perform a higher priority task.

Prior microcontrollers do not effectively provide for real-time task-switching and multi-threading. In certain applications users of these microcontrollers must "brute-force" a solution utilizing microcontrollers that have faster clock rates and wider bus interfaces than would otherwise be necessary. The results are increases in system cost and power consumption as well as increased firmware complexity.

Software developers working on microcontroller based "hard real-time" embedded systems would often prefer not to use an RTOS (Real-Time Operating System), because by eliminating the RTOS, they could get complete control over the execution of their code thereby more easily obtaining very precise timing and control that are necessary for real-time or safety-critical functions. The down side of this approach was that without an RTOS, all of the other higher level, non real-time functions normally carried out by the RTOS also had to be developed as a proprietary software package. This often led to large proprietary software packages that were very difficult to debug and maintain over time.

Over time, as software development and maintenance costs continued to grow, embedded software developers migrated to using RTOS. RTOS vendors provide support, keeping the RTOS updated with new capabilities and fixing bugs etc. Although RTOS vendors provide methods for enabling real-time and safety-critical functions to be performed, the efficiency and determinism of these functions is impacted because the software developer has no direct control over code execution and must rely on the RTOS to manage multi-threaded context switches and interrupts.

Typical applications also require multi-threaded real time processing to handle various control and communications functions. These applications require a microprocessor to execute several hundreds of task switches per second and many concurrent threads. This places an enormous amount of overhead burden on the microprocessor and increases firmware development schedule and cost.

When multiple tasks need to run on a prior art microprocessor, the RTOS grants each task a time slot on the microprocessor. A running task, "X", sometimes needs to be suspended temporarily so that another task, "Y", can be run for a time, after which task "X" is resumed. This suspension function is referred to as context switching. In prior systems context switching is performed by the RTOS saving the context of the task in the processor's memory at a predefined location.

The context of a task denotes its state: all the information required to resume the task at the point where it was interrupted. For a task running in software on a microprocessor, context includes the contents of the processor's registers, the data in the memory on which the task is operating, and information regarding the current state of execution of the task, such as the program counter. Software context switching presents functional and operational limitations. Reconfigurable hardware requires special handling. Both the software states and also the hardware states of the same task must be represented consistently.

Many of the features of modern microprocessors that improve their performance do so in a stochastic fashion, i.e. they increase average-case performance at the cost of a wide variation in the actual execution time from one time to another. Chief among these features is the cached memory architecture. If the code/data currently needed is in cache, then the operation is fast. If the code/data currently needed is not in cache, then the operation is delayed while the cache is filled. Stated another way, on one pass through a point in the control loop, the cache may contain all the information needed and the task is performed very fast, on another pass, the information may not be in cache and the task takes substantially longer.

In the description that follows, the term "deterministic" is utilized. In the context of the present invention, determinism pertains to time. A system that is "deterministic" is one in which every time a sequence of events is to occur, then the time that it takes to perform that sequence of events will always be the same or the variation in time will not be significant.

SUMMARY OF THE INVENTION

The present invention is directed to providing a microcontroller and a microprocessor that has the advantages of high-end machine but with less complexity, both in hardware and in software. The microcontroller and microprocessor of the present invention are particularly advantageously utilized for application to embedded systems of the types involving control problems, where consistent execution times and latency are often more important than raw throughput.

In the specific illustrative embodiment of the invention that is shown and described, a "deterministic microprocessor" is provided. The deterministic microprocessor and microcontroller of the invention are designed to provide rapid interrupt response with minimal variation in response time and fixed execution time for any set of instructions.

The microprocessor of the present invention provides a deterministic response to asynchronous events, i.e., the response to external events occurs within a narrow window of time. To achieve deterministic response, the microprocessor and microcontroller of the present invention provides short instruction execution times, with interrupts enabled via hardware contexts (software in other arrangements typically disables interrupts when working on certain shared structures), and limited overhead for storing registers and performing other related tasks before working on the interrupt.

One microcontroller in accordance with the principles of the invention is a real-time microcontroller in which critical timing parameters including context switching and interrupt latency are precisely predictable for real time tasks. The architecture of a microcontroller in accordance with the present invention provides good throughput with high determinism. A microcontroller in accordance with the invention provides: fast context switching; deterministic caching; and a deterministic memory protection unit.

In accordance with the principles of the invention, a microcontroller is provided that includes "hardware contexts" and in which context management is provided as hardware in the microcontroller. This enables time critical and safety-critical functions to be coded and run directly in one or more "hardware contexts" without any RTOS involvement and, at the same time, allowing an RTOS to run in a separate hardware context with application software supporting the higher level functions.

In the system in accordance with the invention, multiple register banks are utilized to speed up a context switch. In the architecture of the system of the invention a pointer is changed to the set associated with that event, i.e. a different set is utilized for each set of interrupt sources, software interrupt, etc.

The system of the invention provides space and time partitioning to guarantee that one part of the software running on a system can not cause problems in another, higher criticality, part of the system.

One deterministic feature is that every instruction in the deterministic architecture of the present invention takes a fixed period of time, regardless of its inputs. For example, in the microprocessor and microcontroller in accordance with the principles of the invention every shift takes the same period of time, regardless of the number of bit positions the shift is moving.

In accordance with the principles of the invention, a deterministic cached memory architecture is provided in a microprocessor that is purely deterministic in that every time a particular piece of code is executed, it will execute in the same period of time.

In accordance with one aspect of the invention the loading of cache is under software control. Chunks of cache are allocated to specific blocks of code such as interrupt handlers and the highest rate tasks. In a simpler implementation, all cache is pre-allocated.

Further in accordance with another aspect of the invention, although allocation of cache is primarily for instruction cache, allocation of cache may also be applied to data.

In accordance with the principles of the invention a deterministic microcontroller hardware kernel is combined with a number of universal I/O controllers. In accordance with an aspect of the invention, each universal I/O controller is configurable to support various communication protocols across multiple platforms. Each I/O controller is a RISC engine which can be programmed to become any peripheral. Microcode which configures each UIC into a desired peripheral is programmed by application code.

In accordance with an aspect of the invention programs are provided for popular peripherals such as Ethernet, UART, HDLC, Smart GPIO, CAN and other Bus Interfaces. The specific functionality for each universal I/O controller is selectable. For example a first microcontroller in accordance with the invention may be configured to have 2 CANS and an Ethernet. For a different application the same type of microcontroller may be configured with 1 UART, 1 Ethernet, and an HDLC.

The present invention includes hardware support for firmware debug through a set of features that allows faster and less intrusive debug of embedded software.

Determinism and in-system debug are efficiently provided in accordance with aspects of the invention by a hardware kernel and a Software Profiling and Integrated Debug Enviroment (SPIDER™) that are incorporated into microcontroller architecture. In the illustrative embodiment of the invention, SPIDER is a set of features that allows faster and less intrusive debug of embedded software. It includes the following: non-intrusive event logging; context-aware h/w breakpoints and watch points; context-aware hardware for firmware profiling; and context-aware JTAG emulation.

DESCRIPTION OF THE DRAWING

The invention will be better understood from a reading of the following detailed description in conjunction with the several drawing figures of illustrative embodiments of the invention in which like reference designators are utilized to identify like elements, and in which:

FIGS. 7 and 7A illustrates the user programmable cache of FIG. 1 in greater detail;

DETAILED DESCRIPTION

Figure 1:
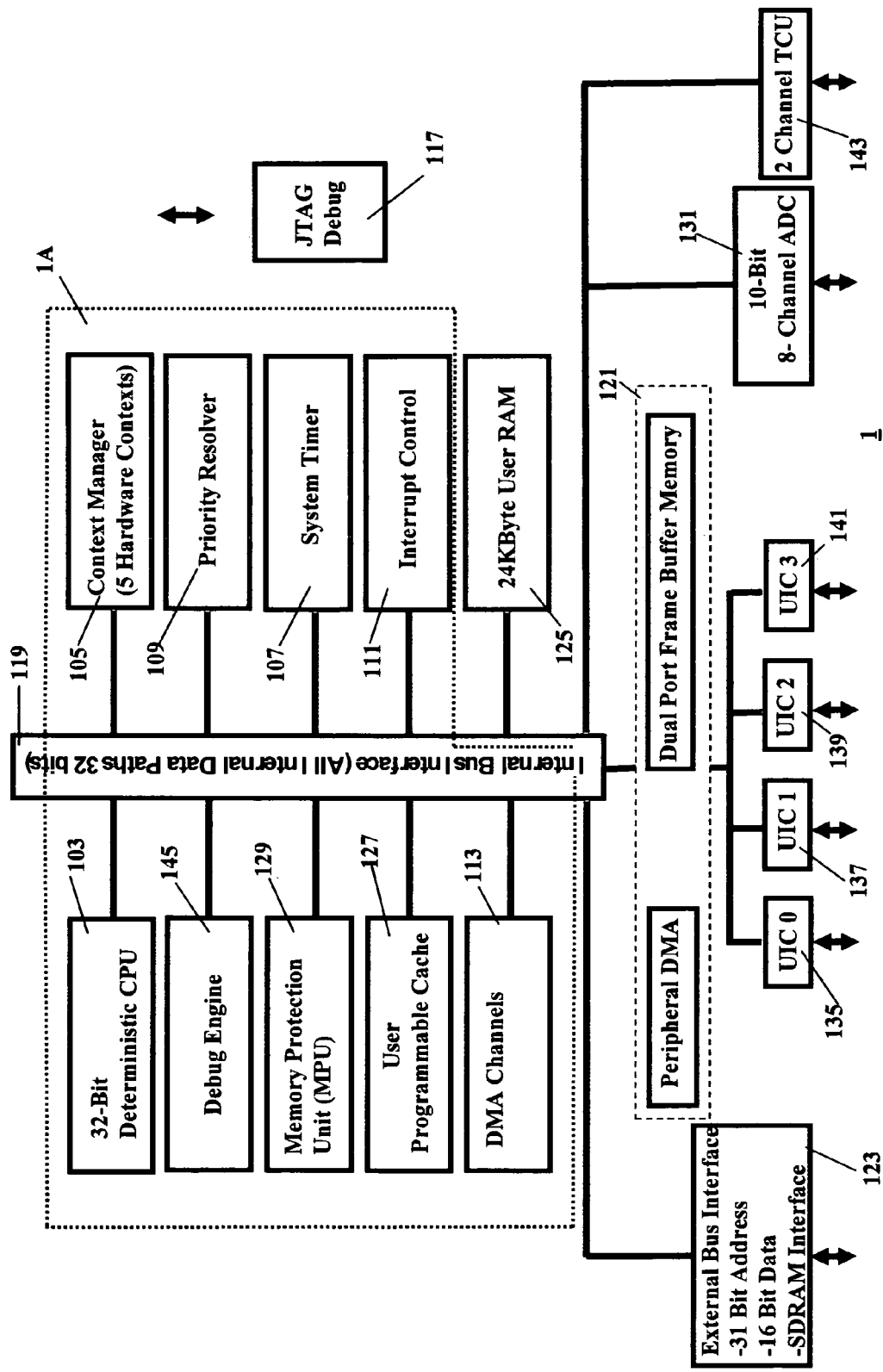
FIG. 1 is a block diagram of an embodiment of a microcontroller in accordance with the principles of the invention.

FIG. 1 illustrates a deterministic microcontroller 1 comprising a microcontroller 1A in accordance with the principles of the invention. Those skilled in the art will appreciate that although the invention is described in the context of the illustrative embodiment of a microcontroller 1 shown in FIG. 1 that various changes and modifications may be made to the embodiment shown or other embodiments may incorporate the inventive features and concepts embodied in microcontroller 1 and microprocessor 1A without departing from the spirit and scope of the invention.

One deterministic feature is that every instruction in the deterministic architecture of the present invention takes a fixed period of time, regardless of its inputs. For example, in microcontroller 1 and microprocessor 1A in accordance with the principles of the invention every shift takes the same period of time, regardless of the number of bit positions the shift is moving.

In contrast, in prior art architectures, a shift instruction takes a varying amount of time based on how much of a shift is being performed. For example, one prior microprocessor architecture takes 2 clock cycles for a single-bit shift, 3 clock cycles for a 2-bit shift, and so on up to 31 clock cycles for a 30-bit shift.

Another example of a deterministic feature of the invention is a multiply instruction. In microcontroller 1 and microprocessor 1A in accordance with the invention, multiply takes the same number of clocks regardless of operands.

In contrast, on many prior microprocessor and microcontroller architectures different combinations of operands require differing numbers of clock cycles to perform a multiply.

Microcontroller 1, is formed as a single integrated circuit shown in FIG. 1 and includes a deterministic microprocessor or hardware kernel 1A, programmable universal I/O controllers that are configurable to support various communication protocols across multiple platforms and a debug feature.

Hardware Kernel

The deterministic hardware kernel or microprocessor 1A provides context isolation with robust time and space partitioning. Microcontroller 1 includes a 32 bit deterministic CPU 103, a context manager 105 that provides five hardware controlled independent contexts, a 32 kbyte user programmable cache 127, a user programmable memory protection unit 129, a priority resolver 109, DMA controller 113, interrupt control 111, system timers 107, and a debug engine 145, all of which are interconnected via an internal bus interface 119.

Microcontroller 1 provides the user with a microprocessor that: has extraordinary interrupt response (low latency) for a small number of sources; provides memory and throughput isolation of different contexts with little or no software overhead for context switching; and supports standard operating systems, tools, and libraries already in existence for the CPU32 family of parts.

Microcontroller 1 supports existing RTOS kernels within the hardware kernel. It provides a platform that can execute existing software along with support for the additional features we provide. Hardware kernel 1A provides functionality that replaces parts of a traditional real time operating system (RTOS).

Figure 2:
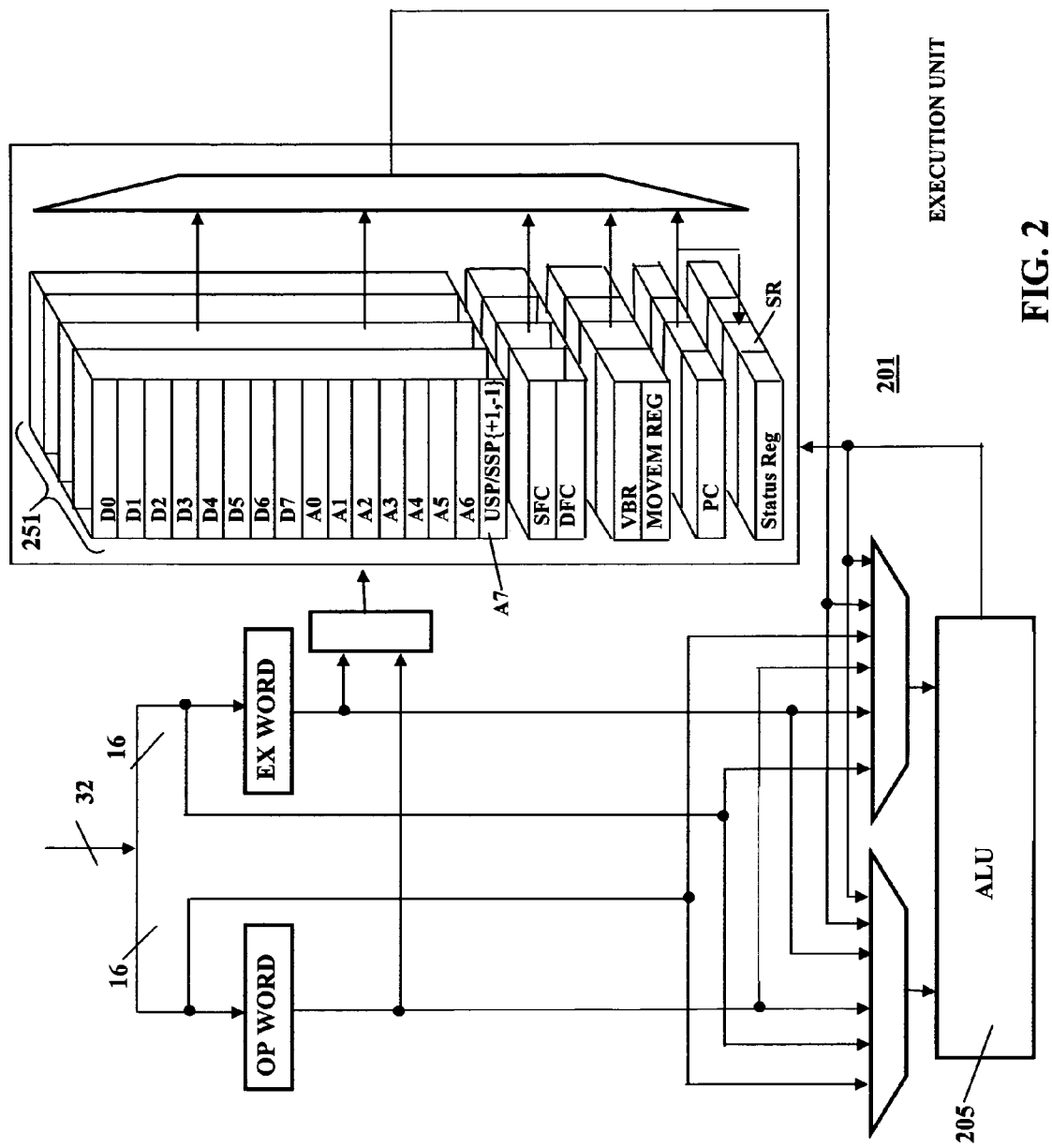
FIG. 2 illustrates a portion of the CPU of the microcontroller of FIG. 1 in greater detail.

In microcontroller 1 and microprocessor 1A in accordance with one aspect of the invention, a plurality of hardware contexts are provided. A context is an operating environment for a thread of software execution. Each context includes user registers, i.e., data registers and address registers; a status register; a program counter; a system stack pointer; a vector base register; and other registers. This set of registers is the register set that would be copied to memory when changing contexts on a typical microprocessor. As shown in FIG. 2, the present invention provides a plurality of sets of these registers as hardware 251. By providing a plurality of sets of hardware registers, microprocessor 1A makes context switches that occur, for example, on an interrupt event, much faster and more deterministically than a typical microprocessor.

A further advantage of providing a plurality of hardware contexts via plurality of sets of registers 251 is that tasks may be automated without software intervention. For example, the Memory Protection Unit 129 shown in FIG. 1 loads a new set of rules whenever contexts change. By way of further example, the DMA 129 may be enabled or disabled on the CPU bus based on context priority.

The illustrative embodiment of microcontroller 1 has 5 hardware contexts as provided by the 5 sets of registers 251 shown in FIG. 2. However, it will be appreciated by those skilled in the art that more or less hardware contexts may be provided. One context is considered to be a master context. All other contexts are equal and subordinate.

The determination of which context is currently active is made in hardware. Each context has two registers that enter into this determination: a context priority register and a context ready status register. The hardware kernel selects for execution the context that currently has the highest priority and is ready to execute.

The Context Priority Register is a three-bit register that allows priorities from 0-7, with 7 being highest priority (to be compatible with standard interrupt priority on the CPU32 architecture).

The Context Ready Status Register has one of the following states:
  Halted—context will not execute until software has moved it to another state.
  Waiting—context is waiting to be made ready (e.g. by an interrupt)
  Ready—context is ready to execute Hardware kernel 1A also includes a Current Context Register which indicates the context currently selected for execution, as well as the Previous Context Register which indicates which context was running previously (this is used by the master context when a fatal fault is detected in another context, allowing it to know which context caused the fault).

Hardware kernel 1A determines which context is currently ready and has the highest priority, if it is not the currently executing context then a context change is performed to bring it into execution.

Context ready status transitions are caused by: interrupts; fatal faults (e.g. a nested bus fault will halt the faulting context); STOP, LPSTOP, RESET, SLEEP, TRAPX; and context timeouts.

If no tasks are in the ready state then CPU 103 will stop fetching instructions and reduce power consumption until an event occurs to place a context in the ready state. If all contexts are in the halted state then the processor is effectively hung and will wait for an external reset.

Each hardware context consists of a corresponding one set of the following registers, identified collectively in the diagram of instruction execution unit 201 of FIG. 2 as registers 251:
  Data D0-D7
  Address A0-A6
  User Stack Pointer A7/USP
  Supervisor Stack Pointer A7/SSP
  Status Register SR
  Program Counter PC
  Vector Base Register VBR
  Source Function Register SFC
  Destination Function Register DFC
  MOVEM flags register MOVEM
  MpuAllocationRegisters Registers 251 includes 5 copies of this set of registers, corresponding to the 5 contexts in microcontroller 1. Hardware determines which of the contexts has the highest priority and is currently ready to run, then switches control to that context.

The MOVEM register flag register stores information to resume MOVEM instructions. The MOVEM instruction includes a 16-bit word that indicates which of the 16 user registers (D0-D7, A0-A7) are to be load or written out. This word is saved as part of the context to allow the instruction to be interrupted.

Contexts have programmable priority with respect to each other. A context priority register is used to program context priorities.

A context ready status register is provided for each context. While not actually a part of the context, i.e., it isn't swapped out as contexts are switched, all copies are always active, a copy of this register is provided for each context.

A Context Timer Register monitors execution time of the associated context. If that time exceeds the value in the Max time register then the context is halted and a fault generated to the master context. The timer can also be placed in a mode to support a time-sliced execution mode in a given context.

A Context Mode Register determines the interrupt mode of the associated context. The interrupt mode is one of a standard mode, vectored mode or single threaded mode:

The standard mode operates such that when an interrupt comes in it pushes the current PC and status register on the stack, goes to supervisor mode, fetches a vector, and begins executing the interrupt service routine. Interrupts can be nested when in this mode.

The vectored mode is a much faster interrupt approach. When an interrupt comes in the associated vector is fetched and execution begins, nothing is saved to the stack. When the routine completes and executes a SLEEP instruction, it simply puts the context into wait mode. This mode does not support nested interrupts, although faults operate just as in standard mode.

The single-threaded mode is the fastest interrupt approach. When an interrupt comes in the thread is made ready and begins execution at the current program counter (e.g. you could have a task that loops back on itself). No distinction is made between interrupt sources. This mode does not support nested interrupts (although faults operate just as in standard mode).

Figure 3:
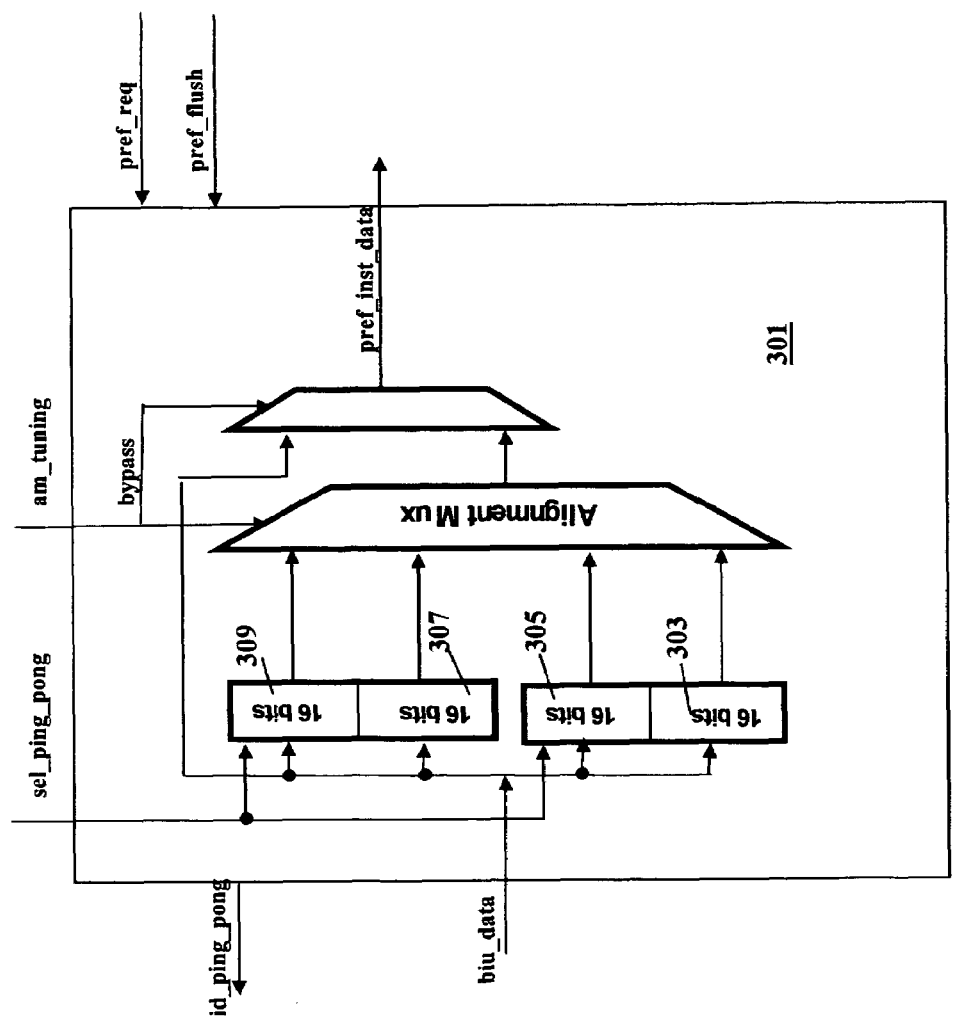
FIG. 3 is illustrates a portion of the CPU of the microcontroller of FIG. 1 in greater detail.
Figure 4:
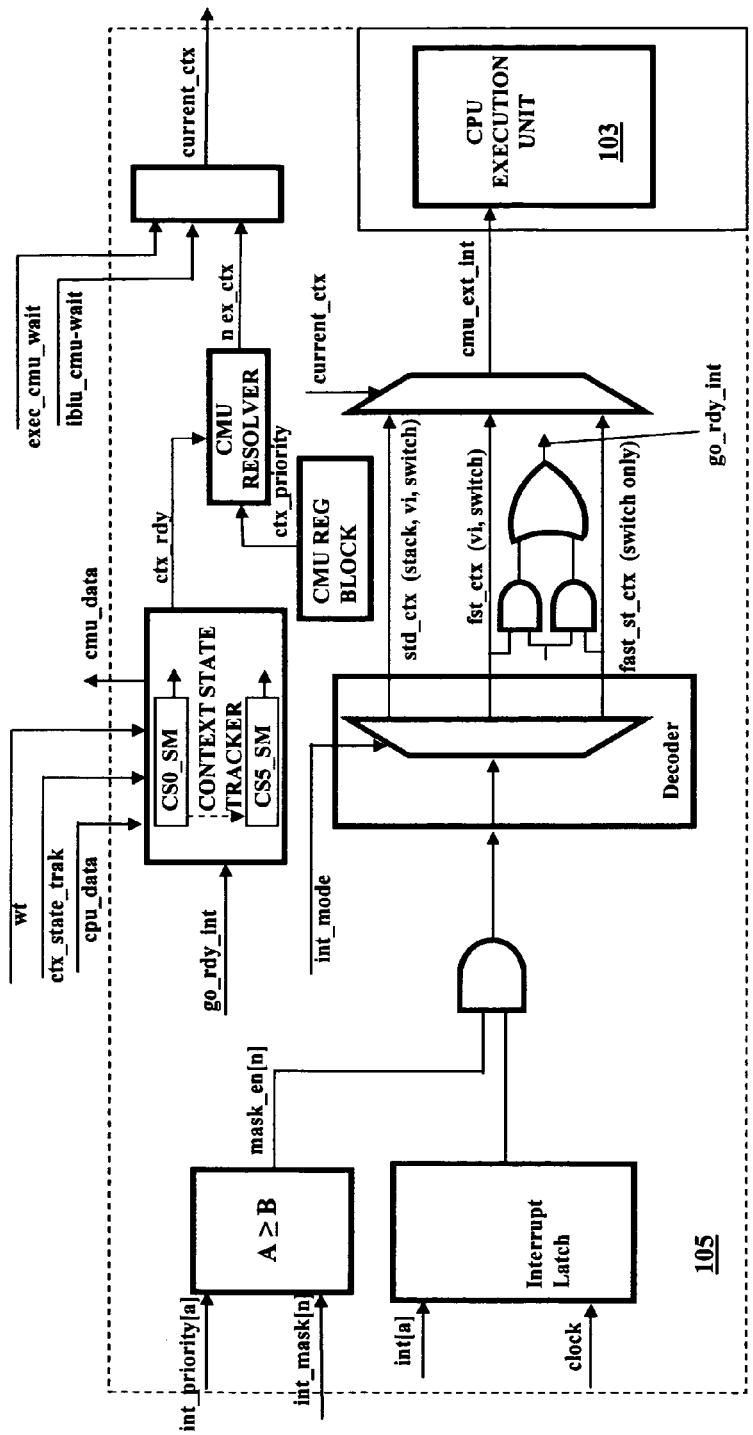
FIG. 4 illustrates the context manager portion of FIG. 1 in greater detail.

The execution unit includes a prefetch module 301 shown in FIG. 3 and instruction execution unit 201 shown in FIG. 2. The Execution unit portion of CPU 101 receives and decodes instructions and sends them to ALU 205. The Execution unit also initiates storing of the instruction result and generates control addresses for branches.

Data from the bus interface unit 119 of FIG. 1 is inputted to a ping pong set of registers 303, 305, 307, 309.

The initial execution cycle bypasses the ping pong set of registers 303, 305, 307, 309 directly to the instruction execution unit 201. Instruction execution unit 309 decodes the op-code, mode, data or address registers, and extension words. Instruction execution unit 309 flows data and data instruction information into ALU 205. The inputs dictate which context the execution unit is handling and which are pending. If a change of context is pending, the execution unit finishes its current execution before switching contexts.

Context Manager

To speed up context switching, context manager 105 utilizes multiple register banks to maintain context.

When hardware determines it is to switch to a particular task the following occurs:

a. hardware changes to the appropriate one register set of registers 251 that includes:
  user registers D0-D7, A0-A7
  status register SR
  program counter PC
  stack Pointer SSP
b. if the target context is in a Dedicated Context mode then execution begins in the switched-to context c. if the target context is in a Vectored Context mode then the program counter is loaded from a vector and execution begins in the switched-to-context
d. if the target context is in Standard Interrupt mode then the program counter PC and status register SR are saved to the stack (along with some stack frame control words), the program counter is loaded from a vector, the supervisor bit in the status register SR is set and execution begins in the switched-to-context Hardware kernel 1A determines which context executes on CPU 103 and controls switching from one context to another. The determination regarding which context should be made current is made as follows:

If context 0, i.e., the master context, is "ready" it will be the next active context. In the illustrative embodiment, context 0 is always the highest priority context.

Otherwise the context that is "ready" and that has the highest priority will be the next active context.

Once a determination is made, if the next active context is different from the current active context then the current context will be frozen, i.e., current instruction is finished or interrupted and state cleaned up, then the next active context will be made active, i.e., next active context's register set will be enabled and execution begun within that context.

Each of the five hardware contexts has a priority associated with it. Each context also has linked interrupts. Priority of any given context can be changed at run time.

The hardware resources in the illustrative embodiment that are utilizable by microcontroller 1 are: CPU—Fast Context Switch; CPU—Deterministic MPU; CPU—Deterministic Cache; CPU—Single Priority Model; and CPU—Context Timers for Time Partitioning. Each resource is described below.

CPU—Fast Context Switch—Microcontroller 1 has the ability to switch from one context to another context within a single bus cycle after the current instruction has been completed.

Figure 6:
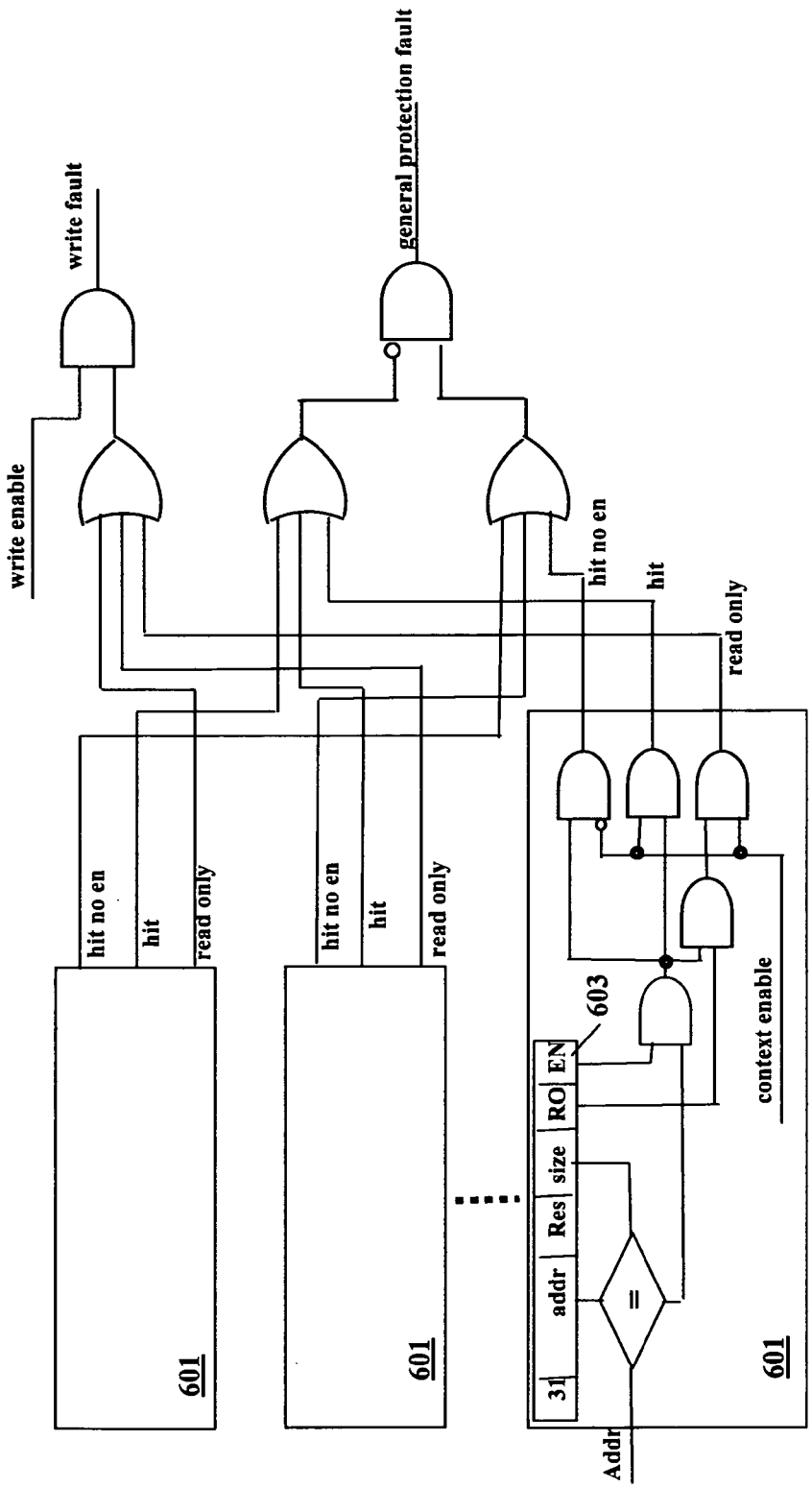
FIG. 6 illustrates a portion of the memory protection unit of FIG. 1 in greater detail
Figure 7:
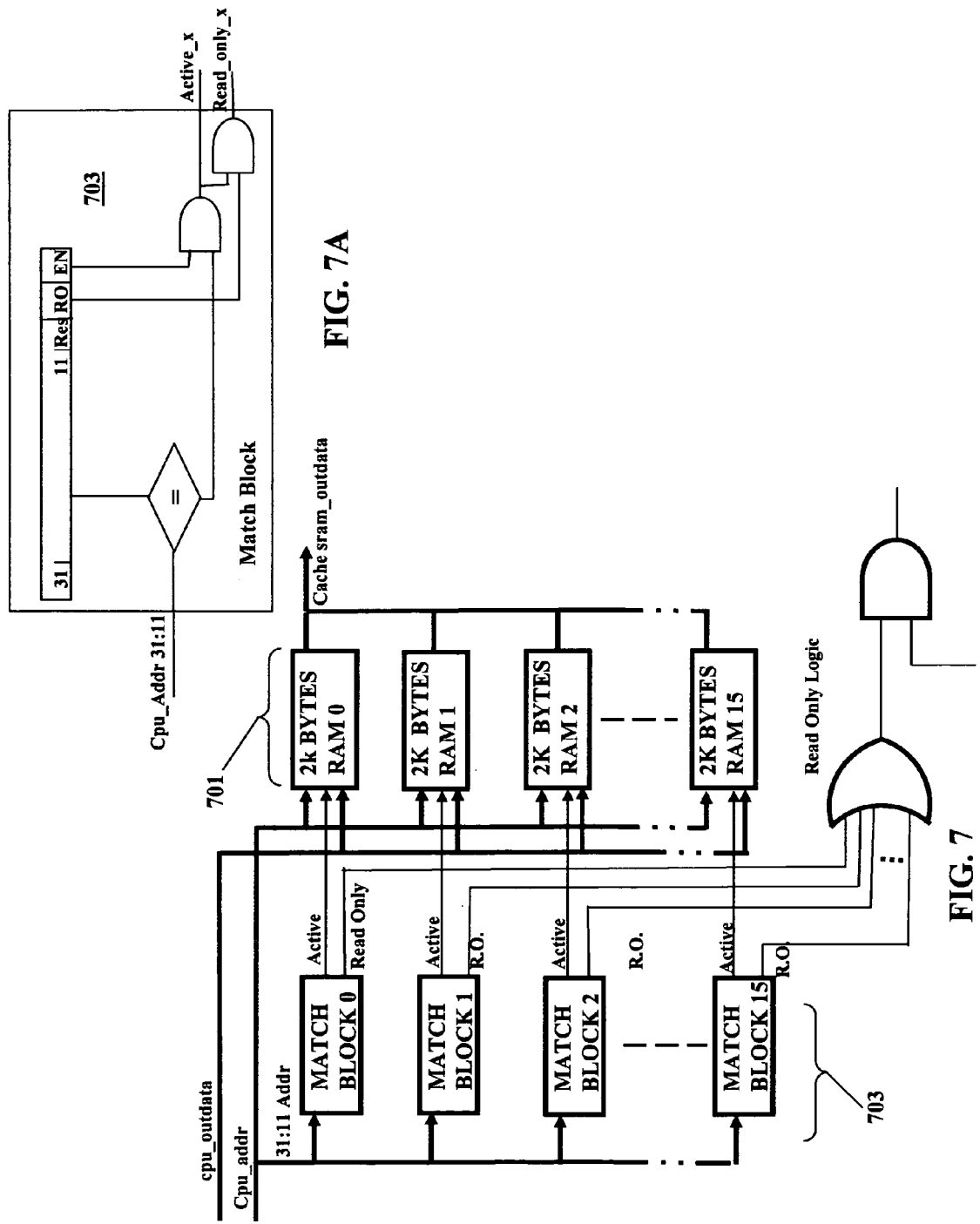

CPU—Deterministic MPU—Memory Protection Unit (MPU) 129 shown of FIG. 1 provides 16 Memory Control Blocks 601 as shown in FIG. 6. Each block 601 has an associated register 603 that defines the starting point, size and attributes of the memory range defined by that block. In addition to these registers, each hardware context has an associated MPU allocation register that identifies which blocks are active for the corresponding context.

The operational rules by which MPU 129 operates are:
If a memory range is not in any block then it is accessible by all contexts.
If a memory range is defined, but is not enabled for the current context then an access to that range will generate an address error fault.
If a memory range is read-only and defined for the current context, a write to that range will generate an address error fault.
Multiple controls can be placed on a single address range, so for example one block can be set up allowing read/write access to some range for context 2 while another block allows read-only access to the same range for context 3.

CPU—Deterministic Cache—Microcontroller 1 contains a Deterministic Cache or user programmable cache 127 shown in FIGS. 7, 7A, 8, and 9 the size of which is preferably at least 8K×32. The loading of cache 127 is under software control. Cache 127 is separated into 16 partitions.

CPU—Single Priority Model—Microcontroller 1 has a single priority model for interrupts and other threads of control. This single priority model is extendable to include other processes such as DMA via DMA channels 113. Although DMA does not require a context as such, it may be assigned a priority on the same scale as the tasks. Thus if a task of lower or equal priority is executing, the DMA will be active; if a higher priority task is executing, the DMA will be halted. If there are multiple DMA channels then they will behave toward each other based on the priority as well. If one DMA has higher priority than the other, then it will run exclusive of the other until it is complete. If two DMAs have the same priority then they share the bus. The assumption is that a software thread (if there is an active one) always gets some share of the bus. Finally, if the currently executing software task is of a higher priority than any active DMAs, the DMAs are held off until a lower-priority task is executing. Also involved in the single priority model is the external bus master arbiter. The external bus master is granted a priority, if the currently ready MCU priorities are lower than the external master, then it will be granted the bus when a request is made. If a higher priority context goes ready then the grant to the external master is revoked, giving the CPU access to the external bus interface.

Figure 5:
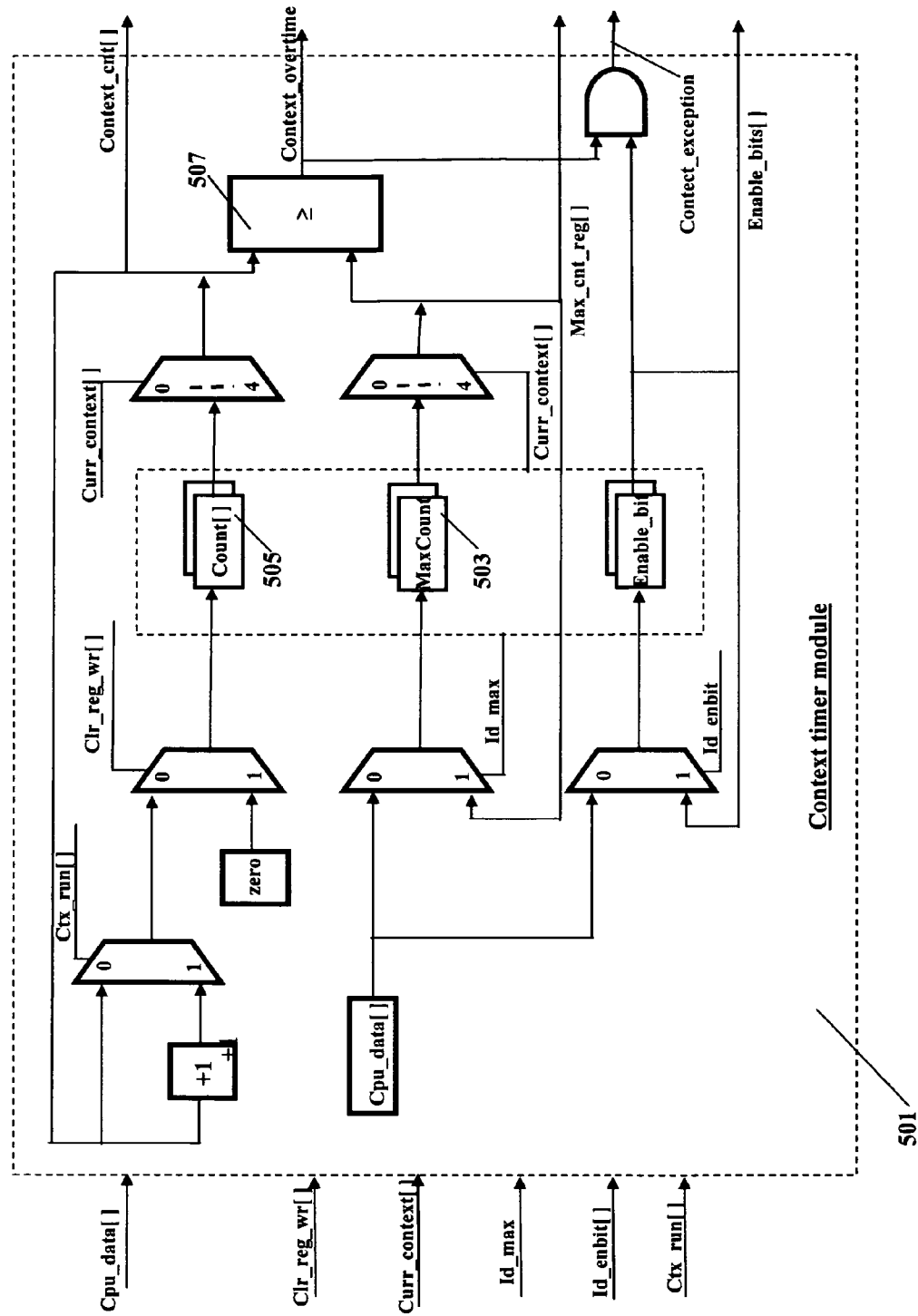
FIG. 5 illustrates a context timer module.

CPU—Context Timers for Time Partitioning—One concern in critical systems such as mission-critical and safety-critical systems or the like is to ensure that a failure in one task does not impact others. Microcontroller 1 assures this through the use of time and space partitioning. Space partitioning is accomplished through the use of MPU 129. Time partitioning usually requires either a high frequency timer interrupt or a highly programmable timer and a lot of software overhead. Microcontroller 1 provides time partitioning via context timer module 501 shown in FIG. 5. Each context is assigned a jmax execution register 503. When the task is active, register 503 is compared by a comparator 507 to a task timer 505. If the task timer 505 exceeds a maximum, max, then a fault is generated to the master context to allow the executive software to deal with the overrun. In another mode the context timers are used to implement time-sliced execution in a given context. In this mode, on a timeout, the timer is reset and a fault is generated to the local context to allow it to perform a software task switch.

CPU—Context-Aware H/W Breakpoints & Watchpoints

The hardware breakpoints and watchpoints are context-specific. This enables breaks on a location when a particular thread is active and the hardware would only interrupt execution when the address matched and the thread matched. This also is extended to support thread-aware watchpoints as well (provide a way to indicate read, write and optionally a value for a given address).

Interrupts are assigned to a particular context and prioritized. Interrupt priority is a "second level" of priority and is distinct from context priority. An interrupt's priority is compared to the context's status register and determination is made to either process the interrupt or to continue "normal" processing of the context.

Interrupt sources have a two-fold association with priorities. First they each have a register associating them with a specific context. The associated context is the one that is interrupted when the condition occurs. Thus the priority of a context also applies to the interrupts assigned to it. The second layer of priority is the model found in the CPU32 architecture. Eight interrupt priority levels (7-0, with 7 being highest) are available to interrupt sources (with a level 7 interrupt being non-maskable). The interrupt priority level found in the status register of each context determines whether the context is interrupted (if currently ready) or is moved to the ready state (if currently waiting).

Each context has a priority associated with it. A separate priority register is provided as a part of the context. Each context also has a ready flag. The hardware detects any change in the state of ready flags. At the time of such a change the highest priority, active, task would be selected for execution.

Operations are provided to allow the setting and clearing of ready flags by software. The ready flags are set by linking an interrupt source to a given context. That is, the 'priority' register normally associated with an interrupt actually refers to a context. When the interrupt event occurs it sets the ready flag for the associated context. Each interrupt points to a given context. Multiple interrupts can point to a given context.

Microcontroller 1 provides the following modes for interaction of interrupts and contexts:

Dedicated context mode: The context is dedicated to the interrupt(s). When the interrupt comes in, if the task is busy, the interrupt is held off until the task goes inactive. If the task is inactive the interrupt comes in immediately thereby activating the task. The task (context) begins execution based on where its program counter is operating. There is no delay and nothing goes to the stack.

Vectored context mode: The context is dedicated to a set of interrupts. When the interrupt comes in, if the task is busy, the interrupt is held off until the task goes inactive. If the task is inactive the interrupt comes in activating the task. The vector associated with the interrupt source is fetched from memory and execution begins at that location. Nothing is preserved of the context.

Standard Interrupt mode: This is interrupt processing as on traditional processors. The associated context's execution is interrupted if it is active. Context is placed on the stack (Program Counter and Status Register). The associated vector is fetched and execution begins in the interrupt handler.

The set described above gives full flexibility and allows a user to take full advantage of fast context switching.

A separate priority register is provided rather than simply using the context ID so that priority of a given task can be changed at runtime. There are various reasons for doing this in an embedded system, e.g., resource deadlock (priority inheritance), or because of a re-tasking of the processor. A rule is established to handle the case where multiple tasks are ready and have the same priority.

Certain operations are limited to a master context of the processor. Operations that fall into this category include:

Defining what is loaded into deterministic cache 127;

Defining deterministic memory protection unit 129 entries;

Defining task contexts (entry points, etc.);

Changing priority of tasks;

Starting/stopping processes;

Allocating interrupts to contexts; and

Setting the priority of DMA channels 113.

Supervisor modes are implemented in the hardware executive by limiting these operations to context 0. A corollary to this is that all fatal/critical faults are handled by context 0.

To explain this, by way of example, consider that microcontroller 1 has just been reset. The hardware begins execution at a reset vector, running in context zero. The software sets up all other contexts, DMA channels, interrupts, etc., then sets context zero's entry point to a fault handler, sets the appropriate ready flags on the other contexts and put itself to sleep This means that context zero can address the context registers of the other tasks which is helpful for debugger development as well.

From this point on, in the example, any changes to priorities, activation of tasks not associated with interrupts, mods to MPU entries, etc. are handled through faults (software interrupts).

When context 0 is activated via a fault the fault that caused the activation as well as what context was executing when the fault occurred will be identified.

This approach allows inter-process control code to be gated through a single context.

A common issue with embedded control systems is understanding throughput on a task-by-task basis. The hardware context described above includes some timing capability. The microcontroller 1 has a timer 107 that executes continuously. Each time there is a context switch the value of timer 107 is added to a register associated with the context of the task being exited and the timer is cleared. Thus the register associated with each task has elapsed execution time for that task. Software executing in context 0 maintains statistics, e.g., average and worst case frame times, and clear the counters on some major or task-specific frame boundaries.

In addition to the above set of user registers, there are additional registers specifically for hardware context control. These include the following:

Faulted Context Register which is a single register used to identify the lower level context executing when an exception occurs;

Context Control Registers which include a register for each context used to specify the context's mode, priority and state;

Context Timer Registers which provide a register for each context used to measure its execution time;

Context Timer Clear Register which is a single register used to clear the timers of selected contexts;

Context Timer Enable Register which is a single register used to enable the timers of selected contexts; and Context Max Time Registers which include a register for each context used to specify the maximum time it can "own" the CPU.

Deterministic Cache

Microcontroller 1 is provided with a deterministic cache. The deterministic cache is a high-speed memory that is loaded with critical code sections under programmer control to increase the execution speed of the associated code. The deterministic cache includes logic to allow the address of each block to be modified by the programmer to overlay slow external memory for critical blocks of code and data.

In microcontroller 1, cache is under software control. Cache portions are allocated to specific blocks of code (typically interrupt handlers, highest rate tasks, etc.). Any portions of the cache not so allocated could operate as typical prior art cache, or for a simpler implementation, just require that all cache be pre-allocated.

Turning to FIGS. 7, 7A, 8 and 9 a deterministic cache is provided comprising a set of blocks of memory 701 associated address translation logic 703. Part of the address in block 703 is decoded to detect a hit on a particular address block. The lower bits of the address are used to address the block.

Figures 8, 9:
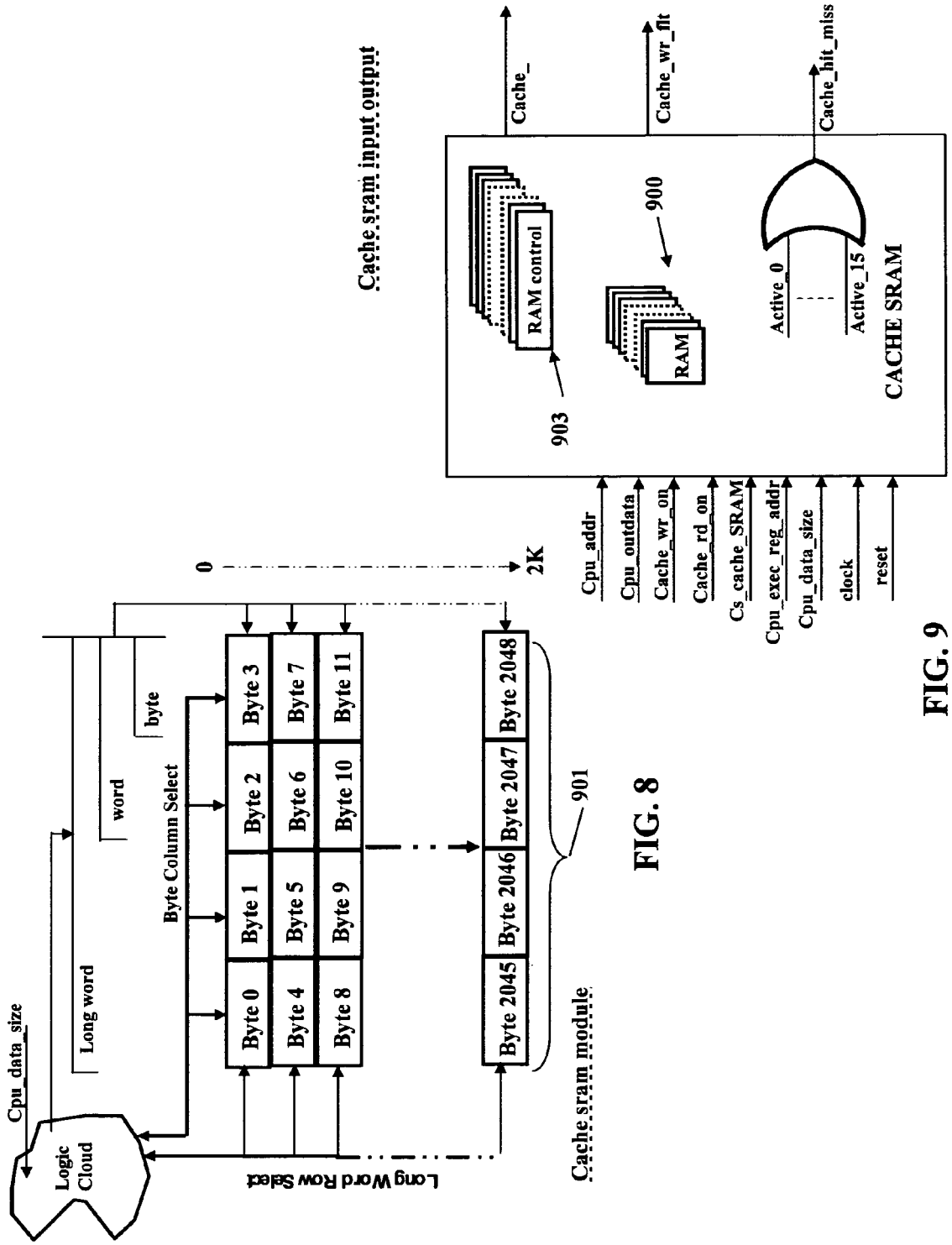
FIG. 8 illustrates the organization of a the cache SRAM module of FIG. 7.
FIG. 9 illustrates the input and outputs of the cache programmable cache of FIG. 7.
Figure 10:
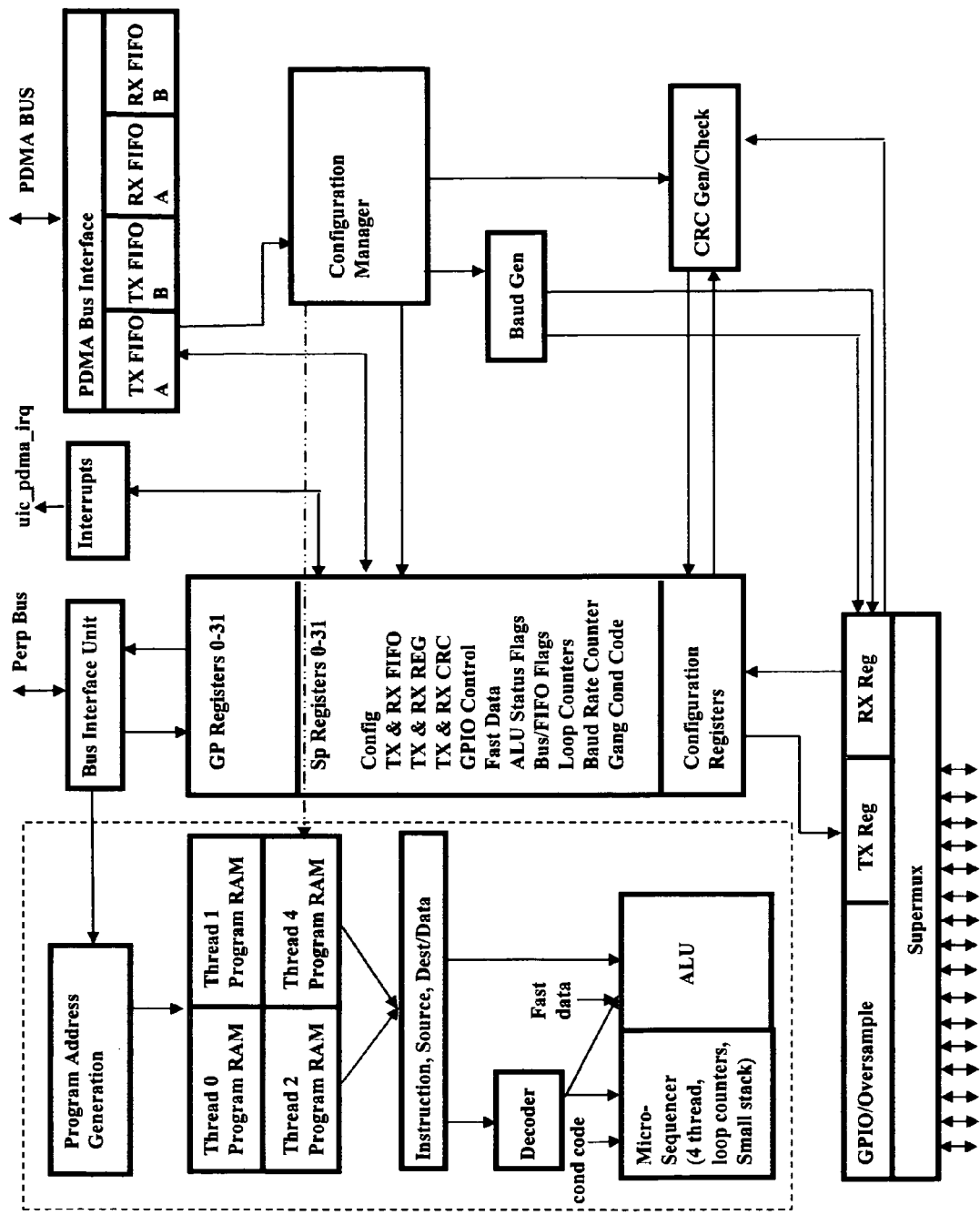
FIG. 10 is a block diagram of a universal input/output controller of FIG. 1.

As shown in FIGS. 8 and 9 a RAM 900 is arranged into a number of blocks 901. Each block 901 can be independently remapped in the memory map (i.e. assigned a new address).

RAM 900, in the illustrative embodiment, has the following characteristics:

Operate at full speed of bus (1 cycle address, 1 cycle data).
Byte writeable
32-bits wide.
total memory size of 8K×32 (32 Kbytes)
total of 16 control registers 903
Each control register 903 manages a 'page' of 2 Kbytes I/O Controllers Microcontroller 1 further includes a plurality of universal I/O controllers 135, 137, 139, 141 identified as UIC 0, UIC 1, UIC 2 and UIC 3. Each universal I/O controller 135, 137, 139, 141 is configurable to support various communication protocols across multiple platforms. Advantageously, each universal I/O controller 135, 137, 139, 141 provides the ability to match specific applications with a single microcontroller chip.

I/O—Each peripheral including a UIC must have the ability to have its clock switched off through software. The I/O architecture of microcontroller 1 in the illustrative embodiment supports 6 high-speed transfers simultaneously.

The I/O architecture of microcontroller 1 also supports Ethernet message filtering. This is not meant to specifically exclude filtering for other protocols. Microcontroller 1 has both a 256-location, 48-bit full address filter and standard hash filtering. The type of filtering is selected under CPU control, by application code.

Microcontroller 1 is able to handle all I/O on a message basis rather than a byte-by-byte basis for the purpose of reducing the processing needs of the CPU. Microcontroller 1, under application control, may also get messages on a byte-by-byte basis.

CPU DMA 113 provides direct memory access capability to/from Dual Port RAM Frame Buffers and bus interface 119.

A peripheral DMA block provides direct memory data transfer capability from the transmit or receive Frame Buffers of any on chip peripheral to or from the CPU_RAM. PeripheralDma is responsible for automatically transferring data to/from the UICs. This block generates all control signals for the Frame Buffers including the cpu side address, peripheral side address, lane selection, and write enable strobes. This operation is transparent as far as the cpu is concerned.

Still further, in the illustrative embodiment of the invention, a "deterministic microcontroller" is provided in which a deterministic microprocessor is coupled with a set of integrated peripherals. The integration is such that peripheral activity does not negatively impact the deterministic properties of the microprocessor.

In accordance with an aspect of the invention, the relationship between external bus and context management unit is a matter of priority. The external bus has a pair of arbitration signals used to allow another device to take over the bus and read/write to external memory. In accordance with another aspect of the invention and in contrast to the approach of prior microprocessors, a priority is assigned to this external interface. An external bus priority register includes bits that are used to assign the priority that the external bus master has relative to internal microcontroller resources, i.e., the plurality of hardware contexts and the CPU DMA controller. The external bus priority register is writeable only from the master context.

The invention has been described in terms of illustrative embodiments. It will be appreciated by those skilled in the art that various changes and modifications can be made to the embodiments without departing from the spirit or scope of the invention. It is not intended that the invention be limited in any way to the specific embodiments shown and described. It is intended that the invention be limited only by the claims appended hereto. It is further intended that the claims be given the broadest scope to which they are permitted under the applicable law.

What is claimed is:

1. A deterministic microcontroller comprising:
a deterministic microprocessor unit;
a real time operating system operable on said deterministic microprocessor unit;
a plurality of hardware contexts, said real time operating system operating in a first predetermined one hardware context of said plurality of hardware contexts, the other contexts of said plurality of hardware contexts operable to run corresponding predetermined functions independent of said real time operating system;
a hardware context manager comprising hardware circuitry operable as a hardware context manager to selectively determine one of a plurality of said hardware contexts of operation of said microcontroller;
a plurality of sets of hardware registers, each set of said hardware registers dedicated to a corresponding respective predetermined one of said hardware contexts and used to store context information for a corresponding predetermined one of said plurality of contexts;
said hardware context manager operating to determine which context of said plurality of hardware contexts is active and operating to selectively switch to a corresponding set of hardware registers from said plurality of sets of hardware registers corresponding to the determined active context, said microprocessor unit utilizing said selected corresponding set of hardware registers;
said hardware context manager and said plurality of sets of hardware registers cooperatively operating such that the contents of each set of hardware registers that is not selected as corresponding to the active context remains stored in its corresponding set of hardware registers for subsequent execution.

2. A deterministic microcontroller in accordance with claim 1, comprising:
apparatus programmable via said deterministic microprocessor unit for determining priority of said plurality of contexts.

3. A deterministic microcontroller in accordance with claim 1, comprising;
context prioritization circuitry programmable to assign priorities to each of said plurality of contexts.

4. A deterministic microcontroller in accordance with claim 3, wherein:
one context of said plurality of contexts is preselected to be a master context.

5. A deterministic microcontroller in accordance with claim 3, comprising:
circuitry having inputs for receiving interrupt information;
interrupt prioritization circuitry programmable to determining priorities of interrupts within each context of said plurality of contexts.

6. A deterministic microcontroller in accordance with claim 3, wherein:
said context prioritization circuitry is utilized to identify one of said contexts as a supervisory context.

7. A deterministic microcontroller in accordance with claim 3, wherein:
said context prioritization circuitry comprises one or more dedicated registers.

8. A deterministic microcontroller in accordance with claim 1, wherein:
each said set of said plurality of sets of hardware registers comprises:
data and address registers;
a status register
at least one stack pointer register; and
a pointer counter.

9. A deterministic microcontroller in accordance with claim 8, comprising:
a single substrate having said microcontroller formed thereon.

10. A deterministic microcontroller in accordance with claim 1, wherein:
said deterministic microcontroller comprises a single integrated circuit.

11. A deterministic microcontroller in accordance with claim 1, comprising:
a user programmable cache.

12. A deterministic microcontroller in accordance with claim 1, comprising:
wherein said deterministic microprocessor unit comprises said plurality of sets of hardware registers.

13. A deterministic microcontroller in accordance with claim 1, comprising:
an internal bus interface;
said internal bus interface coupling said deterministic microprocessor unit, and said hardware context manager.

14. A deterministic microcontroller in accordance with claim 1, comprising:
a user programmable cache coupleable to said deterministic microprocessor unit.

15. A deterministic microcontroller in accordance with claim 14, comprising:
an internal bus interface;
said internal bus interface coupling said deterministic microprocessor unit, said programmable cache and said hardware context manager.

16. A deterministic microcontroller in accordance with claim 1, comprising:
a plurality of programmable I/O controllers, each of said I/O controllers being programmable to interface to one or more of a plurality of standard peripheral interfaces,
each of said programmable I/O controllers being coupleable to said deterministic microprocessor unit.

17. A deterministic microcontroller in accordance with claim 16, comprising:
an internal bus interface;
said internal bus interface coupling said deterministic microprocessor unit and said programmable I/O controllers.

18. A deterministic microcontroller in accordance with claim 17, comprising:
a user programmable cache coupleable to said deterministic microprocessor unit.

19. A deterministic microcontroller in accordance with claim 18, comprising:
a single substrate on which said deterministic microcontroller is formed.

20. A microcontroller comprising:
a microprocessor unit comprising a deterministic microprocessor and a plurality of sets of hardware context registers, each set of said hardware context registers being usable to store context information for a predetermined corresponding one of a plurality of contexts, said microprocessor unit and said plurality of sets of hardware context registers being formed on a single integrated circuit;

a hardware context manager comprisinig hardware circuitry formed on said integrated circuit and operable as a hardware context manager to selectively determine in said hardware circuitry one context of a plurality of contexts of operation of said microcontroller, said context manager operating to select a set of hardware registers from said plurality of sets of hardware registers corresponding to the determined one context of said plurality of contexts, said microprocessor unit utilizing said selected set of hardware registers; and a context timer operable to measure the execution time of each context of said plurality of contexts and to compare the execution time of each said context with a corresponding predetermined maximum execution time and generating a fault signal if said corresponding predetermined maximum execution time is exceeded.

21. A microcontroller in accordance with claim 20, comprising:

an internal bus interface;

said internal bus interface coupling said deterministic microprocessor and said context manager.

22. A microcontroller in accordance with claim 20, comprising:

a user programmable cache coupleable to said deterministic microprocessor.

23. A microcontroller in accordance with claim 22, comprising:

an internal bus interface;

said internal bus interface coupling said deterministic microprocessor unit, said context manager, and said user programmable cache.

* * * * *